July 24, 1962 B. L. KJELGAARD 3,045,518

MACHINE FOR PUNCHING CODED TAPE

Filed Sept. 15, 1958 4 Sheets-Sheet 1

INVENTOR.
Bayard L. Kjelgaard
BY
Clinton S. Janes
ATTORNEY

WITNESS:
Esther M. Stockton

July 24, 1962 B. L. KJELGAARD 3,045,518

MACHINE FOR PUNCHING CODED TAPE

Filed Sept. 15, 1958 4 Sheets-Sheet 2

INVENTOR.
Bayard L. Kjelgaard

BY Clinton S. Janes

ATTORNEY

WITNESS:
Esther M. Stockton

WITNESS:
Esther M. Stockton

INVENTOR.
Bayard L. Kjelgaard
BY Clinton S. Janes
ATTORNEY

July 24, 1962 B. L. KJELGAARD 3,045,518

MACHINE FOR PUNCHING CODED TAPE

Filed Sept. 15, 1958 4 Sheets-Sheet 4

WITNESS:
Esther M. Stockton

INVENTOR.
Bayard L. Kjelgaard
BY
Clinton S. Janes
ATTORNEY

United States Patent Office 3,045,518

Patented July 24, 1962

3,045,518

MACHINE FOR PUNCHING CODED TAPE

Bayard L. Kjelgaard, Odessa, N.Y., assignor to Endicott Johnson Corporation, Endicott, N.Y., a corporation of New York Filed Sept. 15, 1958, Ser. No. 761,247
6 Claims. (Cl. 83—146)

The present invention relates to a machine for punching coded tape, and more particularly a machine for making by a single punching operation a coded tape record of a plurality of items.

By way of illustration, the inventive concept is shown embodied in a device which is particularly well adapted for making in a paper tape a multi-channel record of factors involved in a factory machine operation such as the identity of the operator, the identification of the job or operation, the job rate, material used, etc. It will be understood, however, that the device may readily be adapted for various kinds of record keeping.

It is an object of the present invention to provide a novel code tape punching machine which is efficient and reliable in operation and simple and economical in construction.

It is another object to provide such a device which is automatic in action and versatile in application to various recording requirements.

It is another object to provide such a device which employs coded keys or punch carriers which are detachably and interchangeably mounted in the coding device for recording corresponding items of information.

It is another object to provide such a device in which the keys may be readily recoded to record different items of information.

It is another object to provide such a device which incorporates an automatic non-repeat device which prevents inadvertent or fraudulent repetitious operation.

It is another object to provide such a device in which the insertion of a code key readies the device for operation, but such operation renders that particular key inoperative to release that device for a repeat operation.

It is another object to provide such a device having means to selectively identify itself in respect to a key corresponding to a particular person or operation, whereby a series of coding machines may be operated once only by the same key; such key for instance accompanying and containing coded information relating to a work piece or batch undergoing a series of operations, inspections, etc.

Further objects and advantages will be apparent from the following description taken in connection with the accompanying drawing, in which.

Figure 1:
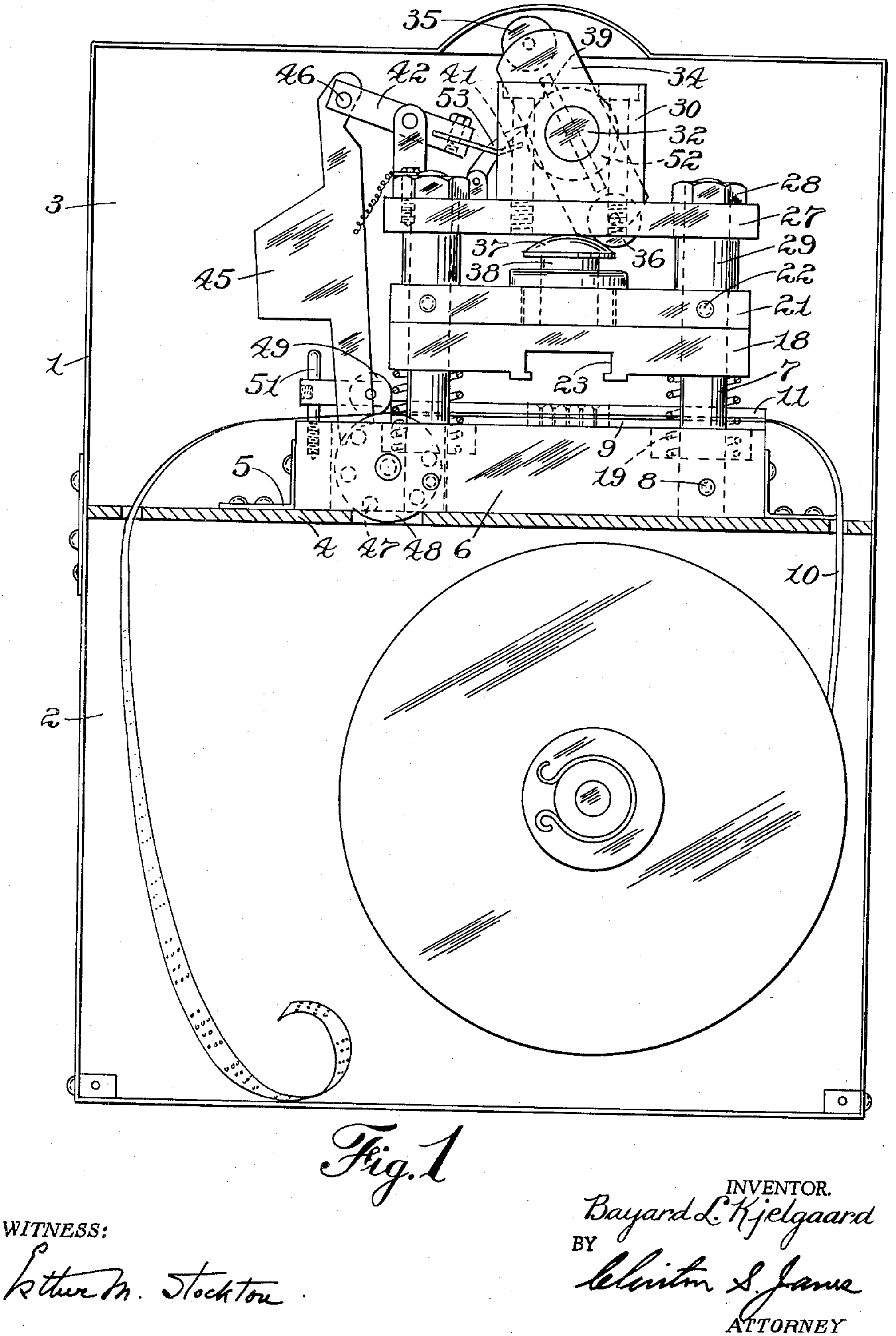
FIG. 1 is a front elevation of a coding machine constituting a preferred embodiment of the invention, with the front cover removed; and the operating handle omitted for clarity.

In FIG. 1 of the drawing there is illustrated a casing indicated generally by the numeral 1 comprising a lower chamber 2 containing a reel of blank tape 10 suitably mounted for rotation, and an upper chamber 3 in which the operating mechanism of the punch is contained and housed. It will be understood that the upper housing may be hinged or locked in any suitable manner to prevent unauthorized access to the punching mechanism.

The partition 4 between the chambers 2 and 3 forms a support for the punching mechanism which is mounted thereon by means of brackets 5 or in any other suitable manner.

Figure 2:
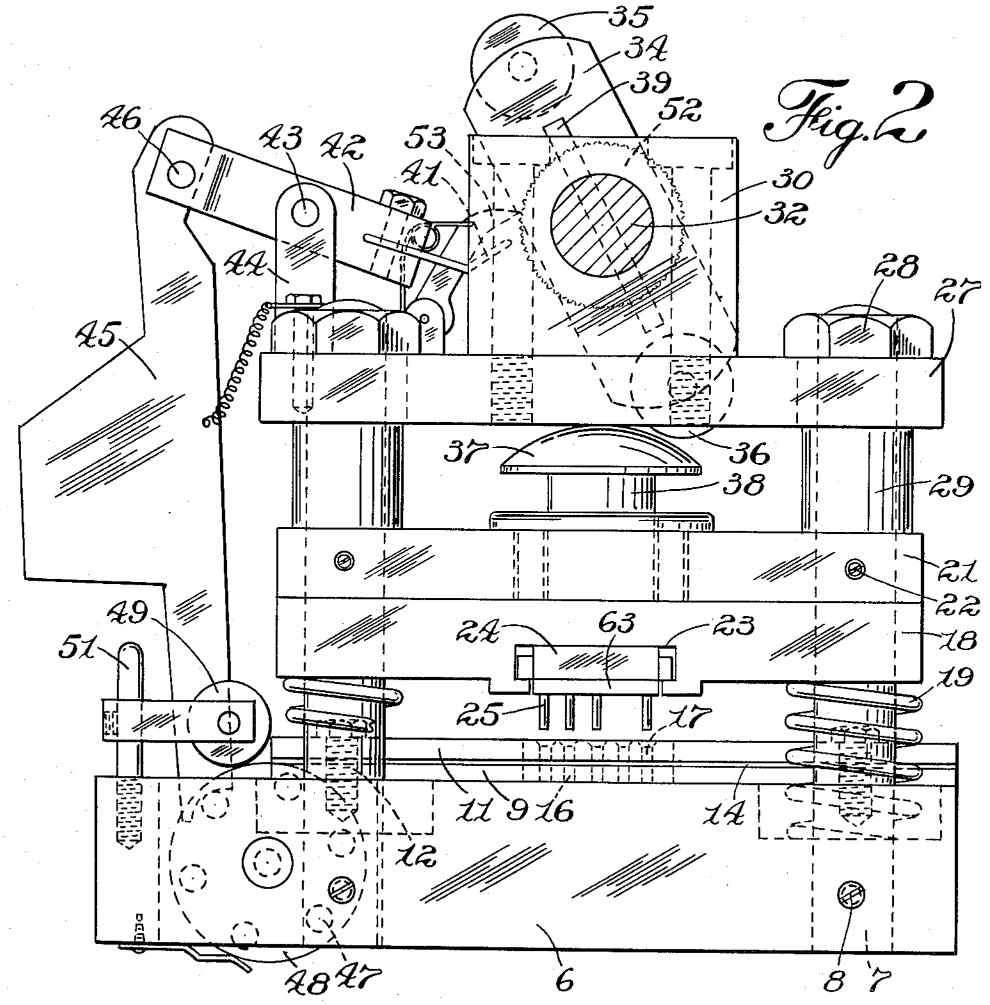
FIG. 2 is an enlarged front elevation of the operating mechanism of the device with the code key in place ready to operate.
Figure 4:
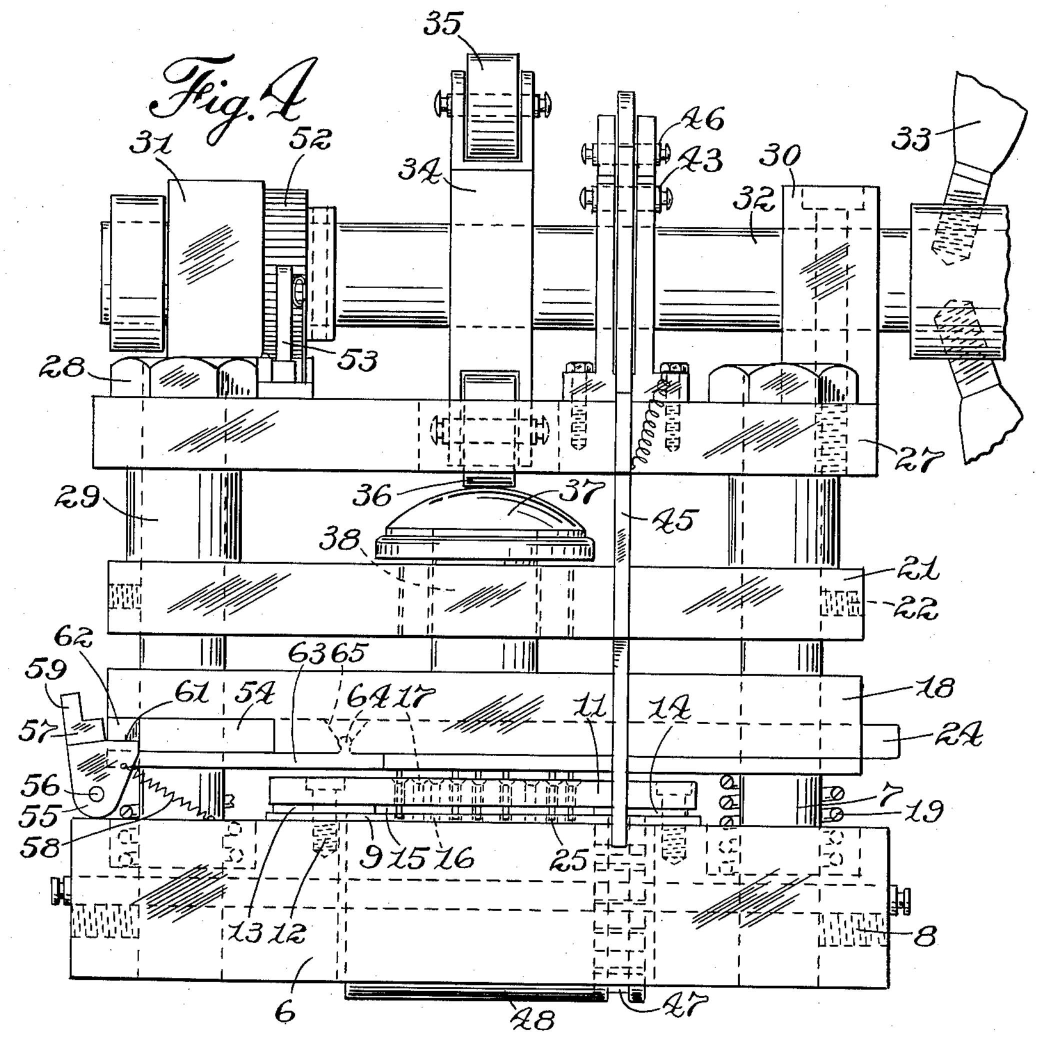
FIG. 4 is a side elevation of the operating mechanism showing the punch at the bottom of its stroke.

As shown in FIG. 2, the punching mechanism comprises a base plate 6 which is drilled for the reception of four vertical guide and mounting posts 7 which are retained therein in any suitable manner as by means of set screws 8. A die plate 9 and a stripper plate 11 are rigidly mounted on the base 6 as by means of screws or studs 12, said plates being separated by spacer strips 13, 14 (FIG. 4), which provide a channel guide 15 for the passage of the tape 10 to be coded. The die plate and stripper plate are provided with a pattern of a plurality of rows of openings 16, 17 respectively which are maintained accurately alined for the reception of the coding punches.

Figure 3:
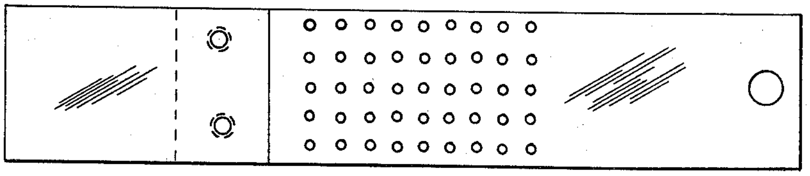
FIG. 3 is an enlarged bottom view of a code key with its plastic latch releasing strip.
Figure 6:
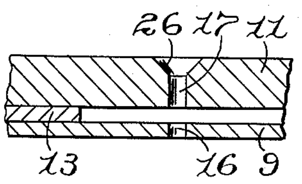
FIG. 6 is an enlarged sectional detail of a portion of the die plate and stripper plate.
Figure 5:
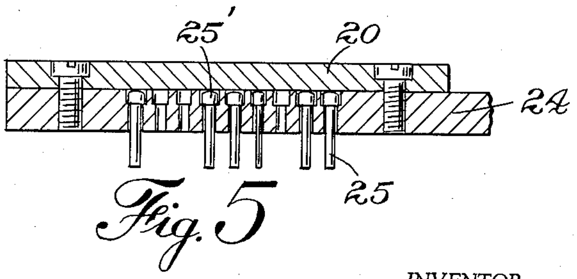
FIG. 5 is an enlarged sectional detail of the punch carrying portion of a key with a plurality of pins or punches mounted therein.
Figures 7, 8, 9, 10:
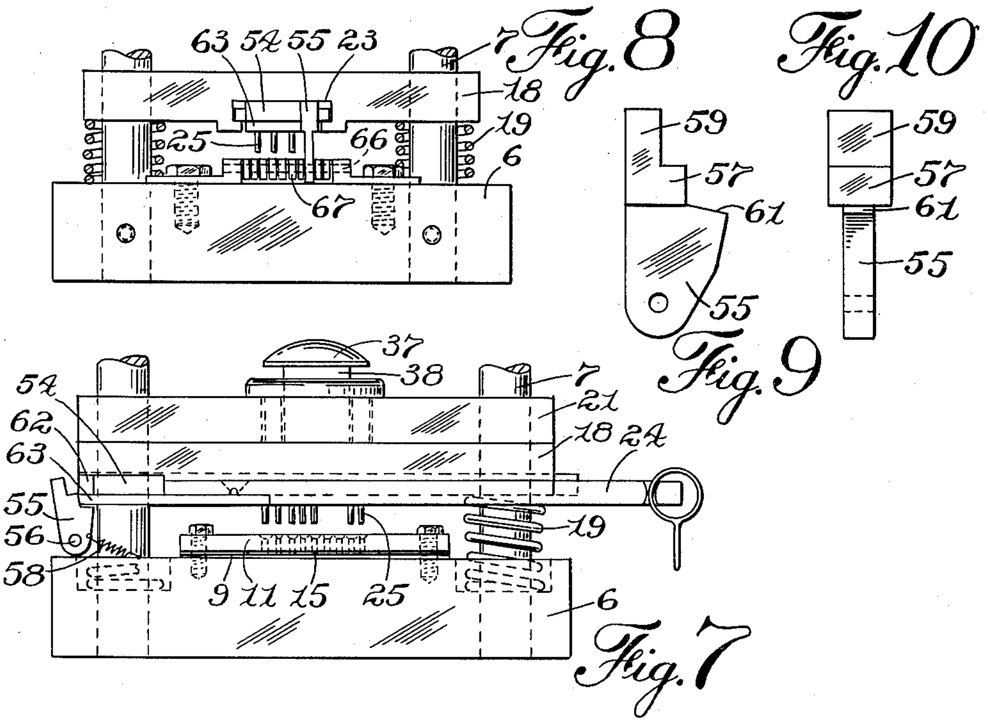
FIG. 7 is a side elevation of the punch mechanism with the key in place and the non-repeat latch released ready to operate.
FIG. 8 is a rear elevation of the latch mechanism and associated parts.
FIG. 9 is an enlarged detail of the latch in side elevation.
FIG. 10 is a front view of the latch.

A carrier or pressure plate 18 is slidably mounted on the posts 7 and is yieldably pressed by springs 19 against a cap plate 21 fixedly mounted on said posts as by means of set screws 22. The pressure plate 18 is formed with an undercut or T-shaped slot 23 slidably receiving a coding key or punch carrier 24 (FIGS. 3 and 7). Said key is provided with vertical perforations in the same pattern as the openings in the stripper plate and die plate, said perforations being adapted to slidably receive the shanks of pins and punches 25 which are inserted in selected locations in the pattern to correspond with items of information or data which it is desired to record in the tape. When the key is fully inserted in the pressure plate as shown in FIG. 7, the pins are alined with the corresponding openings 17, 16 in the stripper plate and die plate (FIG. 6). The pins are formed with enlarged heads 25' seated in counter-bores in the body of the key and are retained by a cover plate 20 (FIG. 5) detachably mounted on the top of the key in any suitable manner whereby, on removal of the cover plate, the key can be conveniently re-coded.

Preferably the pins 25 are allowed a slight amount of looseness for lateral movement in the key, and the upper ends of the openings 17 in the stripper plate 11 are slightly funneled out as shown at 26 in FIG. 6 whereby the pins may accurately aline themselves with the openings in the stripper plate and die plate. It will be understood, however, that the pins 25 may be made integral with a key formed of disposable material such as plastic if proper precautions are taken to secure accurate alinement with their corresponding openings in said plates.

A crown plate 27 (FIG. 4) is rigidly mounted on the upper ends of the posts 7 as by means of clamp nuts 28, spacers 29 being interposed between the crown plate and cap plate. A pair of bearings or perches 30, 31 are rigidly mounted on said crown plate, and an operating shaft 32 having a handle 33 is journalled in said bearings. A cam member 34 is rigidly mounted on said shaft and carries at its ends a pair of rollers 35, 36 which are arranged to engage the domed end 37 of a plunger 38 slidably mounted in the cap plate 21 and resting on the pressure plate 18. Rotation of the shaft 32 causes the cam member 34 to depress the plunger 38 and thereby move the pressure plate 18 down to cause the pins 25 in the coding key 24 to traverse the stripper plate 11 and die plate 9, thereby puncturing the tape in the channel 15 therebetween to record thereon the information coded in said key.

As best seen in FIG. 2 the cam member 34 also carries a laterally extending pin or arm 39 which is arranged to engage a finger 41 projecting from a lever or rocker arm 42 pivoted at 43 on a bracket 44 mounted on the crown plate 27. At the opposite end of the rocker arm 42 a pawl member 45 is pivoted thereon at 46 and extends downward into engagement with pins or projections 47 mounted on a tape advancing roller 48 journalled in the base plate 6. Roller 48 is located at the exit of the tape channel 15, and a presser roll 49 adjustably mounted on a pin 51 extending upward from said base plate is arranged to press the emerging tape against the roller 48 whereby rotation of the roller by the pawl 45 will draw the tape 10 through the channel 15. The roller 48 may be in the form of a sprocket having pins for engaging a continuous series of holes punched in the tape. In most cases, however, it has been found that the tape is reliably advanced when the roller 48 has a coating of adherent or rubber like material.

A ratchet 52 mounted on the operating shaft 32, and a spring pressed pawl 53 pivotally mounted on the crown plate 27 are preferably provided to prevent backward rotation of the operating shaft.

Means are provided for preventing repetitious operation of the punch by a single key. For this purpose, as shown in FIG. 7, a die block and key stop member 54 is rigidly mounted on the rear of the key carrying pressure plate 18, and a latch and punch member 55 is pivotally mounted as indicated at 56 on the base plate 6. As shown in FIGS. 9 and 10, the latch 55 is formed with stepped portions, step 57 being wider than the lower portion of the latch and being arranged to engage under the block 54 and prevent downward movement of the pressure plate 18. This position of the latch is normally maintained by a spring 58, such position being defined by engagement of the upper extension 59 of the latch against the side of the die block 54 as shown in FIG. 11.

Figure 12:
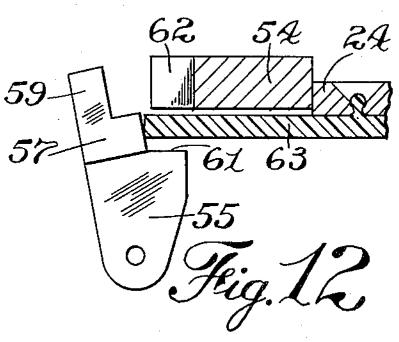
FIG. 12 is a similar view showing the key in place with the latch released.

The lower step 61 of the latch 55 is formed as a cutter, and the die block 54 is formed with a corresponding notch 62 adapted to receive said cutter section of the latch when the latch has been released as shown in FIGS. 7 and 12 to allow downward movement of the pressure plate 18 with the key 24.

Figure 11:
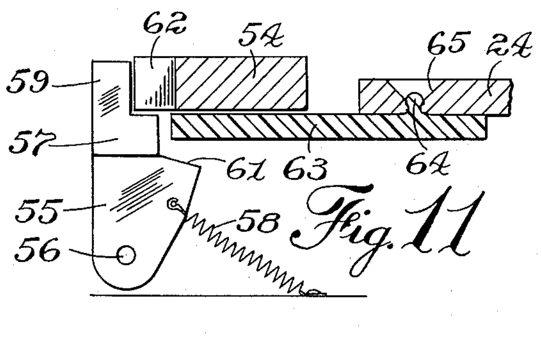
FIG. 11 is an enlarged detail of the latch, key stop and die block with the key about to be fully inserted.

In order to release the latch 55 for actuation of the punch, the key 24 is provided with a strip 63 of plastic material which is preferably detachably connected to the key as shown in FIG. 11. As there illustrated, pear-shaped protuberances 64 are formed on said plastic strip, and the key 24 is formed with double countersunk openings 65 into which these protuberances may be snapped to form a firm but detachable connection.

Figure 13:
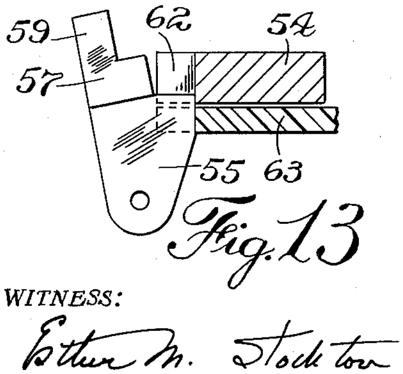
FIG. 13 is a similar view showing the parts after the punch has operated and the plastic latch releasing strip sheared off.

As shown in FIGS. 11 and 12, the insertion of the key 24 to its operative position as defined by abutment against the die block 54 causes the plastic strip 63 to engage the latch and move the step 57 thereof out from under said die block. The pressure plate 18 and key 24 are thus permitted to be moved down by the cam 34 as above described, causing the pins 25 to perforate the tape with the desired pattern. When this takes place, however, the cutter 61 on the latch 55 shears off a corresponding section of the plastic strip 63 as shown in FIG. 13 whereby on upward movement of the pressure plate 18 the latch is permitted to return to its normal position, and further actuation of the machine is prevented until a new key is inserted.

As shown in FIG. 8, the pivot pin 66 for the latch 55 extends for substantially the width of the key 24 and is provided with a plurality of spacing rings 67 whereby the latch may be positioned anywhere along said pin. It will be understood that the die block 54, supplied with each machine, will have a notch 62 corresponding to the chosen position of the latch 55 on the pin 66 whereby that machine is identified with respect to the key to be used therewith.

In operation, a coding machine will be located at each work station, and the operator will be provided with a key which identifies him, the work scale applicable, and/or any other desired information. At the start of his shift, the operator will place his key in the machine and operate it so as to identify the work record to follow. As the work piece or batch comes to his operating station, each piece or batch has its own key accompanying it. The operator, when he has finished his operation, inserts the key in the machine and operates the machine to record his work on his tape. This key will identify the work, and any other desired additional information. The operator will then pass along the work with the key to the next station. It will be understood, that the operation of the machine has rendered the work key inoperative for that particular machine, but subsequent machines have their latching mechanisms set for shearing off different sections of the plastic strip 63 so that the necessary operations may be carried out in sequence, a section of the plastic strip corresponding to each machine being sheared off successively.

After each operation of the machine, the tape 10 is advanced to a new position by the rotating means for the roller 48 comprising the rocker arm 42 and pawl 45, and at the end of the shift the operator will "sign off" with a second personal key or with a new plastic strip attached to his original key.

The record so produced will be read, and the information compiled in the usual manner.

Although but one form of the device has been shown and described in detail, it will be understood that other forms are possible and changes may be made in the design and arrangement of the parts without departing from the spirit of the invention.

I claim:

1. In a device for punching coded information in a record tape or the like, means for holding a tape in operative position including a die plate and a stripper plate spaced to slidably receive the tape therebetween, said plates each having an identical pattern of precisely alined perforations, a code key member having a plurality of pins projecting from one side thereof corresponding in position with certain of the perforations in the die plate and stripper plate, means including a movable carrier having a horizontal slideway for releasably supporting said key member with its pins in alinement with the corresponding perforations in the stripper plate and die plate, means for moving the carrier toward said plates to cause said pins to perforate the tape in accordance with the arrangement of the pins in said key member; releasable means for preventing operation of the perforating means comprising a movable latch positioned at the end of, and adjacent to said horizontal slideway, while the carrier is in its raised position, and normally positioned in the path of movement of said carrier, and means on said code key member for moving the latch away from its normal position to thereby allow operation of the perforating means when said key member is seated in its operative position in the carrier.

2. A code punching device as set forth in claim 1 including means actuated by operation of the perforating means for rendering the key inoperative to move the latch away from its normal position.

3. A punching machine as set forth in claim 1 in which the entrances to the openings in the stripper plate are flared slightly, and the pins in said key are releasably retained therein with freedom for lateral movement to aline themselves with said openings.

4. A machine for punching coded information in a tape comprising a base, means fixedly mounted on the base for locating and guiding a tape including a die plate, a stripper plate, and spacing means therebetween forming a guide channel for the tape, said plates having an identical pattern of alined openings therethrough in the area of said channel, guiding means fixedly mounted on the base perpendicular thereto, a carrier plate slidably mounted on said guiding means for movement toward and from said die and stripper plates, a coding punch key in the form of a flat strip having punch pins projecting laterally therefrom corresponding to selected openings in said die plate and stripper plate, said carrier plate having means including a horizontal slideway for releasably receiving said key and positioning it with its pins alined with the corresponding openings in said die plate and stripper plate, and manually operable means for moving the carrier plate to cause the pins in said key to traverse said openings and thereby punch corresponding holes in the tape; means including a latch member pivotally mounted on said base positioned at the end of, and adjacent to said horizontal slideway while the carrier is in its raised position normally operative to engage and prevent movement of the carrier plate toward the base, and means on said key for engaging the latch and releasing it by moving it out of operative position when the key is seated in said positioning means of the carrier plate.

5. A tape punching machine as set forth in claim 4 in which said means for engaging the latch is frangible, and the latch member is formed as a cutter operative to notch out the latch engaging portion of said means when the carrier plate moves toward said base, thereby rendering the key inoperative to move the latch out of operative position.

6. A tape punching machine as set forth in claim 5 in which said latch is laterally adjustable on the base to bring it into registry with different portions of said frangible means, whereby the latch may be engaged and moved out of operative position by a key member which has been previously used in a similar machine having its latch differently positioned.

References Cited in the file of this patent

UNITED STATES PATENTS

| | | |
|---|---|---|
| 197,326 | Brownson | Nov. 20, 1877 |
| 211,619 | Campbell | Jan. 28, 1879 |
| 1,068,447 | Raffel | July 29, 1913 |
| 1,313,956 | Schwalbach | Aug. 26, 1919 |
| 1,486,561 | Belisle | Mar. 11, 1924 |
| 1,947,387 | Freeman | Feb. 13, 1934 |
| 1,952,152 | Wilkie | Mar. 27, 1934 |